Figure 2:
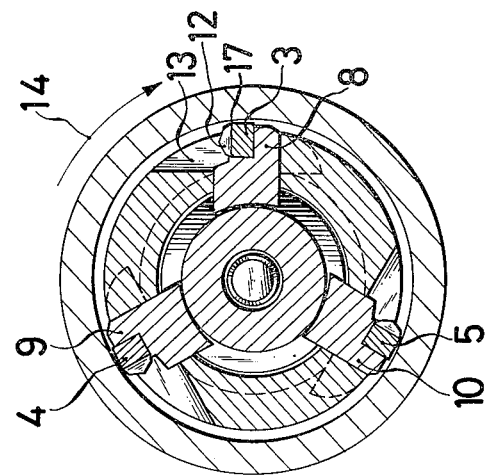

United States Patent [19]

Seppelt

[11] 4,223,577

[45] Sep. 23, 1980

[54] APPARATUS AND METHOD FOR MACHINING CYLINDRICAL INTERNAL SURFACES

[75] Inventor: Bernhard Seppelt, Solingen, Fed. Rep. of Germany

[73] Assignee: Th. Kieserling & Albrecht, Solingen, Fed. Rep. of Germany

[21] Appl. No.: 949,888

[22] Filed: Oct. 10, 1978

[30] Foreign Application Priority Data

Oct. 13, 1977 [DE] Fed. Rep. of Germany ....... 2746033

[51] Int. Cl.³ .................. B23B 1/00; B23B 41/06; B23B 27/10
[52] U.S. Cl. ........................ 82/1 C; 82/1.5; 408/57; 408/705
[58] Field of Search ............ 82/1 C, 1.2, 1.5, 2 R; 407/115, 116; 408/1 R, 1 BD, 56, 57, 59, 60, 61, 147, 158, 159, 164, 172, 705, 229, 230

[56] References Cited

U.S. PATENT DOCUMENTS

| 1,243,446 | 10/1917 | Richard | 407/116 |
|---|---|---|---|
| 2,014,679 | 9/1935 | Eckroate | 408/57 |
| 2,188,631 | 1/1940 | Kraus | 408/59 |
| 2,283,491 | 5/1942 | Daley | 82/1 C |
| 2,677,170 | 5/1954 | Kuns et al. | 407/116 |
| 2,821,874 | 2/1958 | Oliver | 82/1.2 |
| 2,863,341 | 12/1958 | Rosato et al. | 408/59 |
| 3,213,716 | 10/1965 | Getts | 408/229 |
| 3,664,755 | 5/1972 | Carns | 408/159 |
| 4,023,451 | 5/1977 | Acton et al. | 82/1.5 |
| 4,086,733 | 5/1978 | Vig | 408/230 |

*Primary Examiner*—Harrison L. Hinson
*Attorney, Agent, or Firm*—Edward E. Sachs

[57] ABSTRACT

Internal cylindrical surfaces are machined with a machining head movable longitudinally along the internal surface. The machining head carries at least one cutting tool having a cutting edge and a chip deflecting surface positioned for deflecting metal chips toward the trailing end of the machining head.

4 Claims, 2 Drawing Figures

APPARATUS AND METHOD FOR MACHINING CYLINDRICAL INTERNAL SURFACES

The invention relates generally to machining of metal and, more particularly, to machining of generally cylindrical internal surfaces of workpieces.

Machining cylindrical internal surfaces raises problems with removal of chips which cannot move past the machining tool. Various machining tools have been devised for minimizing the problem of chip removal. For example, it is known to provide a machining head to be moved longitudinally through a bore so the metal chips do not have to move past the machining head. However, machining tools of this type frequently have problems with the build up of chips in the immediate vicinity of the machining head. Cavities must be formed in the machining head adjacent the cutters for accommodating the chips and this reduces the number of cutters which can be positioned circumferentially around the machining head. In addition, the cavities become filled with metal chips and the chip build up problem is not completely solved.

It is therefore the primary object of the present invention to provide a machining head with cutting tools positioned in such a manner that metal chips formed by the machining operation are deflected toward the trailing end of a machining head on which the cutters are mounted.

It is a further object of the invention to provide such a machining head with cutting tools mounted to position their cutting edges and chip deflecting surfaces at an acute angle to the longitudinal axis of the machining head.

It is an additional object of the invention to provide an improved apparatus and method for machining cylindrical internal surfaces.

An aspect of the present invention resides in a machining head movable longitudinally through a cylindrical internal surface. The machining head has leading and trailing ends, and a cutting tool mounted on the head has a cutting edge and a chip deflecting surface positioned relative to the longitudinal axis of the head for deflecting metal chips toward the trailing end of the head. This arrangement minimizes the size of any desirable or necessary cavity adjacent the cutting tools so that a larger number of cutting tools can be positioned circumferentially around the machining head. The cutting tools edges and chip deflecting surfaces are positioned for directly deflecting the metal chips into the free space behind the trailing end of the machining head. This is a highly simplified manner of alleviating any problem with chip build up in the vicinity of the machining head.

The cutting tool insert is positioned with a cutting edge and a chip deflecting surface extending at an included acute angle with the longitudinal axis of the machining head. When a replacable cutting tool insert is used, as is preferred, the bottom surfaces of the inserts may be sloped, or the necessary angle may be machined into the tool holder on which the insert is mounted. Obviously, other arrangements may be provided for locating the cutting tools at the desirable angles for deflecting the chips toward the trailing end of the machining head.

As the machining head moves longitudinally past the internal cylindrical surface which rotates relative to the machining head, the inclined cutting edge on the cutting tool performs a drawing cutting motion similar to the action of cutting a loaf of bread. This cutting action produces a highly satisfactory metal chip. The cutting edge of the cutting tool is preferably curved to generally correspond with the curvature of the cylindrical internal surface. The sharply convex form or curvature of the tool cutting edge depends upon the diameter of the cylindrical internal surface, the length of the cutting edge, and the permissible amount of irregularity in the surface being machined.

The cutting edge of the cutting tool is preferably inclined at an included angle of between 15°–40° to the longitudinal axis of the machining head. However, the angle can vary between 5°–50° for certain purposes. It has been found that this range provides satisfactory chip deflection toward the trailing end of the machining head, and the machining performance is also adequate.

For a better understanding of the present invention, together with other and further objects thereof, reference is had to the following description taken in connection with the accompanying drawing, and its scope will be pointed out in the appended claims.

Figure 1:
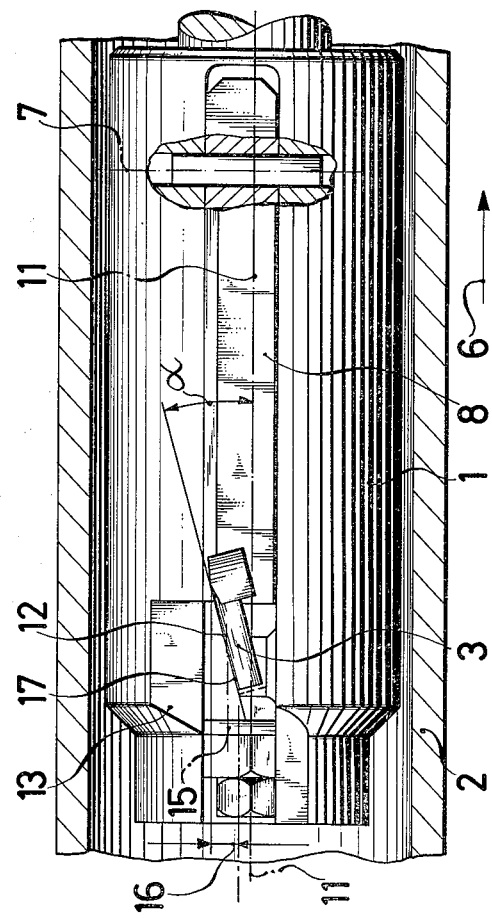

In the drawing:

FIG. 1 is a cross-sectional elevational view of a length of pipe having a machining head positioned therein and carrying cutting tools mounted in accordance with the present application; and FIG. 2 is a cross-sectional elevational view taken adjacent the left end of FIG. 1 and looking from left to right in FIG. 1.

Referring now to the drawing, and particularly FIG. 1, there is shown a boring tool in the form of a machining head 1 located in the cylindrical bore of an elongated pipe 2. As shown in FIG. 2, three peeling cutters 3, 4 and 5 are mounted on the machining head 1, and the head 1 is drawn through the pipe 2 in the direction of arrow 6 in FIG. 1. The pipe 2 rotates in the direction of arrow 14 in FIG. 2 relative to the machining head 1 and the cutting tools 3, 4 and 5 carried thereby.

The cutting tools 3, 4 and 5 are mounted in pivoted tool holders 8, 9 and 10. The pivot axis for one such tool holder 8 is generally indicated at 7 in FIG. 1. Each tool holder 8, 9 and 10 extends generally parallel to the longitudinal axis 11 of the machining head 1 and the pipe 2. The tool holders 8, 9 and 10 move generally radially outwardly or inwardly of the longitudinal axis 11 by pivoting about their pivot axis shown at 7 for holder 8.

All of the cutting tools 3, 4 and 5 are mounted to their holders in the same manner, and the manner of mounted one tool 3 will be explained in detail. The cutting tool 3 has a chip deflecting surface generally indicated at 12 and a cutting edge 17. The chip deflecting surface 12 and the cutting edge 17 extend both longitudinally and circumferentially of the machining head 1. The cutting edge 17 is inclined relative to the longitudinal axis 11 and intersects same, as viewed in FIG. 1, at an included angle alpha which is between 5°–50°, and preferably between 15°–40°. The chip deflecting surface 12 is similarly inclined for deflecting metal chips toward the trailing end of the machining head 1. The projection of the chip deflecting surface 12 which faces longitudinally of the machining head 1 is generally indicated at 16 in FIG. 1. That longitudinal projection of the chip deflecting surface 12 faces directly toward the free space at the trailing end of the machining head 1 opposite from the leading end thereof. The leading one of the machining head 1 faces in the direction of the arrow 6, while the trailing end thereof faces in an opposite direction. The cutting edge 17 may be considered as lying in a plane which intersects the longitudinal axis 11 at the angle alpha. A line 15 on the internal surface of the pipe 2 extending parallel to the longitudinal axis 11 will also be intersected by the cutting edge 17 and the chip deflecting surface 12 at the angle alpha.

The machining head 1 has a chip receiving cavity 13 adjacent each cutting tool in the circumferential direction facing the chip deflecting surface 12. Such chip receiving cavities are common and the improved tool mounting arrangement of the present application makes it possible to reduce the size of the cavities 13 so it is possible to mount a large number of cutting tools in a given circumference if so desired.

When it is stated that a cutting tool is mounted on a machining head, it will be recognized that this means more than one cutting tool could be so mounted on the head. Likewise, when it is stated that the cutting tool has a cutting edge and a chip deflecting surface positioned for deflecting chips toward the trailing end of the machining head, it will be recognized that the cutting tool can have other cutting edges in addition.

While there has been described what is at present considered to be the preferred embodiment of this invention, it will be obvious to those skilled in the art that various changes and modifications may be made therein without departing from the invention, and it is aimed therefore, in the appended claims to cover all such changes and modifications which fall within the true spirit and scope of the invention.

What is claimed is:

1. Apparatus for machining the interior surface of a cylindrical workpiece comprising: a machining head having a longitudinal axis and leading and trailing ends, means for drawing said machining head in one direction longitudinally through a pipe for machining the interior surface thereof and with said leading end facing said one longitudinal direction and with said trailing end facing in an opposite direction, a cutting tool mounted on said head for movement generally radially inwardly and outwardly of said axis, said tool being mounted on said head adjacent said trailing end and spaced from said trailing end toward said leading end, said cutting tool having a cutting edge and a chip deflecting surface inclined relative to said longitudinal axis of said head and extending both circumferentially and longitudinally of said head with said chip deflecting surface facing both in said opposite direction toward said trailing end of said head and in one circumferential direction, and a chip receiving cavity in said head adjacent said chip deflecting surface, whereby when said head is drawn through a pipe during relative rotation therebetween for causing said cutting tool to machine the interior surface of the pipe said chip deflecting surface deflects chips both into said cavity and into the free space in the pipe beyond said trailing end of said head.

2. The apparatus of claim 1 wherein said cutting edge is curved to generally correspond with the curvature of the interior surface of a cylindrical workpiece.

3. The apparatus of claim 1 wherein said cutting tool is mounted on a holder pivotally connected to said head adjacent said leading end thereof for providing said generally radial inward and outward movement of said tool.

4. A method of machining the interior surface of a cylindrical workpiece comprising the steps of: drawing a machining head longitudinally through an elongated cylindrical workpiece, engaging the interior surface of the workpiece with a cutting tool carried by said head adjacent the trailing end thereof for generally radial inward and outward movement, relatively rotating said head and workpiece to machine said surface and form metal chips, deflecting the chips into the free space in the workpiece beyond the trailing end of said head by mounting said cutting tool with a cutting edge extending both longitudinally and circumferentially of said head and with a chip deflecting surface facing both circumferentially of said head and longitudinally thereof back toward said trailing end.

* * * * *